US011863932B2

(12) United States Patent
Wang

(10) Patent No.: US 11,863,932 B2
(45) Date of Patent: Jan. 2, 2024

(54) SOUND-ABSORBING MATERIAL AND SPEAKER USING SAME

(71) Applicant: AAC Microtech (Changzhou) Co., Ltd., Changzhou (CN)

(72) Inventor: Hezhi Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 23 days.

(21) Appl. No.: 17/563,018

(22) Filed: Dec. 27, 2021

(65) Prior Publication Data

US 2023/0096193 A1 Mar. 30, 2023

(30) Foreign Application Priority Data

Sep. 29, 2021 (CN) .......................... 202111150702.4

(51) Int. Cl.
*H04R 1/28* (2006.01)

(52) U.S. Cl.
CPC .......... *H04R 1/288* (2013.01); *H04R 2400/11* (2013.01)

(58) Field of Classification Search
CPC .... H04R 1/288; H04R 1/2876; H04R 1/2869; H04R 1/28; H04R 1/2803; H04R 2400/11
See application file for complete search history.

(56) References Cited

U.S. PATENT DOCUMENTS 4,657,108 A * 4/1987 Ward .................... H04R 1/2803 181/149
7,448,467 B2 * 11/2008 Wright ................. H04R 1/2803 381/345
7,743,877 B2 * 6/2010 Saiki .................... H04R 1/2803 381/345
7,953,240 B2 * 5/2011 Matsumura .......... H04R 1/2803 381/337
8,184,826 B2 * 5/2012 Matsumura .......... H04R 1/2803 181/149
8,265,330 B2 * 9/2012 Fukunishi ............ H04R 1/2803 423/455
8,630,435 B2 * 1/2014 Mellow .................. H04R 1/225 381/345
8,794,373 B1 * 8/2014 Lin ........................ H04R 1/288 381/345

(Continued)

FOREIGN PATENT DOCUMENTS

CN 106875934 A * 6/2017 ........... G10K 11/162
CN 113179470 A * 7/2021 ............... H04R 9/02

(Continued)

*Primary Examiner* — Edgardo San Martin
(74) *Attorney, Agent, or Firm* — W&G Law Group

(57) ABSTRACT

Provided is a sound-absorbing material, including a metal-organic framework material having a microporous structure. The metal-organic framework material includes a coordinated metal M and organic framework materials (OFs) coordinated with the coordinated metal. The microporous structure includes a plurality of uniformly distributed micropores, and a diameter of each of the plurality of micropores is within a range of 0.3 nm to 1.2 nm. The sound absorbing material including the metal-organic framework material can be added into a speaker to increase the acoustic compliance of air in a rear cavity of the speaker, thereby improving the performance of the speaker in a low frequency range.

8 Claims, 2 Drawing Sheets

(56) References Cited

U.S. PATENT DOCUMENTS

| | | | | |
|---|---|---|---|---|
| 8,885,863 | B2 * | 11/2014 | Takashima | B82Y 40/00 181/149 |
| 8,942,402 | B2 * | 1/2015 | Yuasa | H04R 1/02 381/345 |
| 9,900,675 | B2 * | 2/2018 | Papakyriacou | H04R 1/2803 |
| 10,419,848 | B2 * | 9/2019 | Choi | H04R 31/00 |
| 10,506,333 | B2 * | 12/2019 | Wang | H04R 1/2876 |
| 10,939,195 | B2 * | 3/2021 | Dai | B01J 20/186 |
| 11,014,820 | B2 * | 5/2021 | Tang | B01J 20/18 |
| 11,109,149 | B2 * | 8/2021 | Feng | B01J 20/18 |
| 11,140,475 | B2 * | 10/2021 | Tang | C01B 39/04 |
| 11,206,491 | B2 * | 12/2021 | Zhou | H04R 9/02 |
| 11,488,570 | B2 * | 11/2022 | Feng | H04R 1/025 |
| 11,570,544 | B1 * | 1/2023 | Wang | H04R 1/025 |
| 2007/0165895 | A1 * | 7/2007 | Matsumura | H04R 1/2803 381/345 |
| 2007/0286449 | A1 * | 12/2007 | Matsumura | H04R 1/2803 381/433 |
| 2011/0048844 | A1 * | 3/2011 | Papakyriacou | H04R 1/288 181/151 |
| 2017/0195781 | A1 * | 7/2017 | Kang | H04R 1/2811 |
| 2020/0031678 | A1 * | 1/2020 | Feng | C01B 39/023 |
| 2020/0031679 | A1 * | 1/2020 | Tang | C01B 39/04 |
| 2020/0037066 | A1 * | 1/2020 | Feng | H04R 1/2876 |
| 2022/0021966 | A1 * | 1/2022 | Coakley | B01J 20/3293 |

FOREIGN PATENT DOCUMENTS

| | | | | |
|---|---|---|---|---|
| CN | 216391309 | U | * | 4/2022 |
| CN | 216930316 | U | * | 7/2022 |
| CN | 115497445 | A | * | 12/2022 |

* cited by examiner

SOUND-ABSORBING MATERIAL AND SPEAKER USING SAME

TECHNICAL FIELD

The present disclosure relates to the field of heat dissipation technologies for speakers, and in particular, to a sound-absorbing material and a speaker using the same.

BACKGROUND

As technologies develop, electronic products have become thinner and lighter and people have higher and higher requirements for the use experience of electronic products. For speakers of electronic products, people hope to obtain better audio effects. The sound quality is related to every aspect of the speaker design and manufacturing process, especially to the size of a rear cavity of the speaker. Generally, size reduction of the rear cavity of the speaker will significantly reduce the low-frequency response, resulting in poor sound quality, so it is difficult to provide good sound quality in a case of a small rear cavity.

In order to solve the above technical problems, conventional methods are mainly as follows: 1. replacing the air in the rear cavity with a gas with better acoustic compliance; 2. filling the rear cavity with foam (such as melamine) to increase the acoustic compliance; and 3. filling the rear cavity with porous materials such as activated carbon, zeolite, silicon dioxide, and the like to increase the virtual volume of the back cavity and improve the acoustic compliance. Among them, the third method is the most effective. At present, the zeolite filled in the rear cavity is mainly of MFI, MEL, FER and BEA structure types, and there is no research report on metal-organic framework materials (MOFs).

SUMMARY

An objective of the present disclosure is to provide a sound-absorbing material and a speaker using the same to overcome the above technical problems. The addition of the sound-absorbing material into a rear cavity of the speaker can increase the acoustic compliance of the air in the rear cavity of the speaker, thereby improving the performance of the speaker in a low frequency range.

In order to achieve the above objective, the present disclosure provides a sound-absorbing material, including a metal-organic framework material having a microporous structure. The metal-organic framework material includes a coordinated metal M and organic framework materials (OFs) coordinated with the coordinated metal. The microporous structure includes a plurality of uniformly distributed micropores. A diameter of each of the plurality of micropores is within a range of 0.3 nm to 1.2 nm.

As an improvement, the diameter of the micropores is within a range of 0.4 nm to 1.0 nm.

As an improvement, Al is used as the coordinated metal M, and the OFs include isophthalic acid or 2-aminoterephthalic acid.

As an improvement, the metal-organic framework material is of a CAU-10 type or a CAU-1-NH2 type.

As an improvement, a particle size of the metal-organic framework material is within a range of 0.1 um to 5 um.

As an improvement, the sound-absorbing material further includes an adhesive, and the metal-organic framework material is formed into sound-absorbing particles after adding the adhesive.

As an improvement, the sound-absorbing particles are spherical and have a particle size of 20 um to 1.0 mm.

As an improvement, the adhesive includes one or more of an acrylic adhesive, a polyurethane adhesive or an epoxy resin adhesive.

As an improvement, a mass of the adhesive is 1% to 10% of a mass of the sound-absorbing material.

The present disclosure further provides a speaker, including a housing with an accommodating space, a sounding unit placed in the housing, and a rear cavity defined by the sounding unit and the housing. The rear cavity is filled with the sound-absorbing material as described above.

Compared with a related art, the sound-absorbing material and the speaker using the same, as disclosed in the present disclosure, have the following beneficial effects: the sound-absorbing material is arranged to include a metal-organic framework material of a microporous structure; the metal-organic framework material includes a coordinated metal M and OFs coordinated with the coordinated metal; the microporous structure includes a plurality of uniformly distributed micropores, and the diameter of the micropores is within a range of 0.3 nm to 1.2 nm. The sound-absorbing material is added to the rear cavity of the speaker, and the micropores with the diameter of 0.3 nm to 1.2 nm absorb and desorb air under the action of sound pressure, which can increase the acoustic compliance of the air in the rear cavity, thereby improving the low-frequency performance of the speaker.

BRIEF DESCRIPTION OF DRAWINGS

In order to make the technical solutions of embodiments of the present disclosure more clear, drawings to be used for description of embodiments will be explained briefly as follows. It is appreciated that, drawings used in the following description are merely some embodiments of the present disclosure. Those skilled in the art also may obtain other drawings based on these drawings without paying creative efforts.

DESCRIPTION OF EMBODIMENTS

Figure 1:
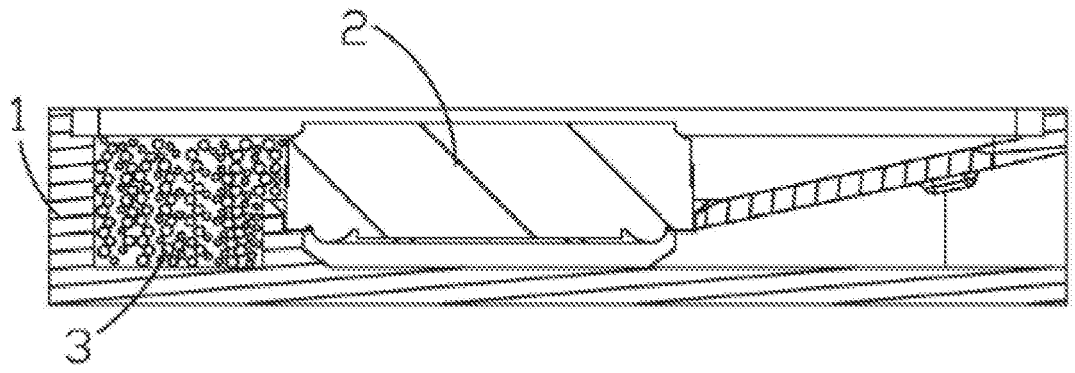
FIG. 1 is a schematic structural diagram of a speaker of the present disclosure.

The technical solutions in embodiments of the present disclosure will be described clearly and completely below in connection with the drawings in the embodiments of the present disclosure, and it will be apparent that the embodiments described here are merely a part, not all of the embodiments of the present disclosure. All other embodiments obtained by a person of ordinary skill in the art based on the embodiments of the present disclosure without creative efforts shall fall within the protection scope of the present disclosure.

A speaker of the present disclosure includes a housing 1 with an accommodating space, a sounding unit 2 placed in the housing 1, and a rear cavity 3 defined by the sounding unit 2 and the housing 1. The rear cavity is filled with a sound-absorbing material.

The sound-absorbing material includes a metal-organic framework material of a microporous structure. The metal-organic framework material includes a coordinated metal M and organic framework materials (OFs) coordinated with the coordinated metal. The microporous structure includes a plurality of uniformly distributed micropores, and a diameter of the micropores is within a range of 0.3 nm to 1.2 nm. The micropores absorb and desorb air under the action of sound pressure, which can increase the acoustic compliance of the air in the rear cavity 3, thereby improving the low-frequency performance of the speaker.

In one embodiment, the diameter of the micropores is within a range of 0.4 nm to 1.0 nm.

It should be noted that, in this embodiment, Al is used as the coordinated metal M, and the OFs include isophthalic acid or 2-aminoterephthalic acid. For example, a CAU-10 type metal-organic framework material formed by a combination of the coordination metal Al and isophthalic acid in a certain arrangement has a number of uniformly distributed micropores inside with a diameter of 0.4 nm and 0.7 nm; a CAU-1-NH2 type metal-organic framework material formed by a combination of the coordinated metal Al and 2-aminoterephthalic acid in a certain arrangement has a number of uniformly distributed micropores inside with a diameter of 0.45 nm and 1.0 nm.

It should be noted that the sound-absorbing material may be metal-organic framework material powder or sound-absorbing particles, which are arranged in the rear cavity 3 in a filling manner. Generally, a particle size of the metal-organic framework material powder is small and within a range of 0.1 um to 5 um. Therefore, in actual applications, the sound-absorbing material usually further includes an adhesive. The metal-organic framework material is formed into sound-absorbing particles of a specific shape by adding the adhesive. The formed sound-absorbing particles are relatively large to be suitable as a sound-absorbing material. The adhesive may include one or more of an acrylic adhesive, a polyurethane adhesive and an epoxy resin adhesive.

It should be noted that, in this embodiment, the sound-absorbing material is formed as sound-absorbing particles, and the mass of the adhesive in the sound-absorbing particles is 1% to 10% of the mass of the sound-absorbing material.

The sound-absorbing particles can be spherical, irregular, blocky, and the like. It should be noted that, in one embodiment, the sound-absorbing particles are optionally spherical and have a particle size of 20 um to 1.0 mm.

It should be noted that the sound-absorbing particles can be prepared by spray drying, and the preparation method includes:

Mixing metal-organic framework material powder with an adhesive and a solvent to form a solution, the solvent mainly refers to water and common organic solvents (such as ethanol, methanol, acetone, tetrahydrofuran, and the like);

Causing the mixed solution to pass through a nozzle to form dispersed droplets, and desolvating and solidifying the dispersed droplets by heating to obtain product particles;

Sieving the product particles to select product particles with a particle size of 20 um to 1.0 mm as the sound-absorbing material.

It should be noted that, in order to facilitate the forming process of the sound-absorbing particles or to improve the performance of sound-absorbing particles, a small amount of an additive can be added to the mixed solution of the raw material, and the dose of the additive is usually less than 2%. The additive can be alkali, hydrogen peroxide, surfactant, or the like.

The implementation manners of the present disclosure will be explained below in conjunction with specific examples.

EXAMPLE 1

The sound-absorbing material of this example was sound-absorbing particles formed from a CAU-10 type metal-organic framework material and an adhesive.

The sound-absorbing material of this example was prepared as follows.

A metal-organic framework material powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

The mass of the adhesive is 3% of the mass of the sound-absorbing material.

EXAMPLE 2

The sound-absorbing material of this embodiment was sound-absorbing particles formed from a CAU-1-NH2 type metal-organic framework material and an adhesive.

The preparation method of the sound-absorbing material in this was prepared as follows.

A metal-organic framework material powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

The mass of the adhesive is 3% of the mass of the sound-absorbing material.

COMPARATIVE EXAMPLE 1

The sound-absorbing material of this comparative example was sound-absorbing particles formed from a MIL-101(Cr) type metal-organic framework material and an adhesive. The MIL-101(Cr) type metal-organic framework material was formed by a combination of a coordinated metal Cr and terephthalic acid in a certain arrangement.

The sound-absorbing material of this comparative example was prepared as follows.

A metal-organic framework material powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

The mass of the adhesive is 3% of the mass of the sound-absorbing material.

COMPARATIVE EXAMPLE 2

The sound-absorbing material of this comparative example was sound-absorbing particles formed from a MIL- 53(Al) type metal-organic framework material and an adhesive. The MIL-53(Al) type metal-organic framework material was formed by a combination of a coordinated metal Al and terephthalic acid in a certain arrangement.

The sound-absorbing material of this comparative example was prepared as follows.

A metal-organic framework material powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

The mass of the adhesive is 3% of the mass of the sound-absorbing material.

COMPARATIVE EXAMPLE 3

The sound-absorbing material of this comparative example was sound-absorbing particles formed from a MIL-100(Fe) type metal-organic framework material and an adhesive.

The MIL-100(Fe) type metal-organic framework material was formed by a combination of a coordinated metal Fe and trimesic acid in a certain arrangement.

The sound-absorbing material of this comparative example was prepared as follows.

A MOFs powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

A mass of the adhesive is 3% of the mass of the sound-absorbing material.

COMPARATIVE EXAMPLE 4

The sound-absorbing material of this comparative example was sound-absorbing particles formed from a Uio-66 type metal-organic framework material and an adhesive. The Uio-66 type metal-organic framework material was formed by a combination of a coordinated metal Zr and terephthalic acid in a certain arrangement.

The sound-absorbing material of this comparative example was prepared as follows.

A MOFs powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

The mass of the adhesive is 3% of the mass of the sound-absorbing material.

COMPARATIVE EXAMPLE 5

The sound-absorbing material of this comparative example was sound-absorbing particles formed from a MIL-101(Al)—NH2 type metal-organic framework material and an adhesive. The MIL-101(Al)—NH2 type metal-organic framework material was formed by a combination of a coordinated metal A and 2-aminoterephthalic acid in a certain arrangement.

The sound-absorbing material of this comparative example was prepared as follows.

A metal-organic framework material powder was mixed with an adhesive and a solvent to form a solution.

The mixed solution passed through a nozzle to form dispersed droplets, and then the dispersed droplets were dehydrated and solidified by heating to obtain product particles.

The product particles were sieved to select product particles with a particle size of 20 um to 1.0 mm as the sound-absorbing material.

The mass of the adhesive is 3% of the mass of the sound-absorbing material.

COMPARATIVE EXAMPLE 6

Melamine foam Basotec produced by BASF was selected as a sound-absorbing material.

The sound-absorbing materials of Examples 1 to 2 and Comparative Examples 1 to 6 were respectively filled in a rear cavity of a speaker for acoustic performance testing. The results are shown in Table 1. The speaker adopted was of a model 1115, the volume of its back cavity is 1 cc, and the environment temperature at which the testing was carried out was ambient temperature.

Table 1 Resonant frequency F0 before and after addition of a sound-absorbing material in the rear cavity of the speaker

TABLE 1

| | F0 before addition of a sound-absorbing material in the rear cavity/Hz | F0 after addition of a sound-absorbing material in the rear cavity/Hz | F0 change before and after addition/Hz |
|---|---|---|---|
| Example 1 | 914 | 846 | 68 |
| Example 2 | 912 | 834 | 78 |
| Comparative Example 1 | 915 | 873 | 42 |
| Comparative Example 2 | 913 | 865 | 48 |
| Comparative Example 3 | 914 | 876 | 38 |
| Comparative Example 4 | 913 | 872 | 41 |
| Comparative Example 5 | 915 | 880 | 35 |
| Comparative Example 6 | 914 | 892 | 22 |

According to Table 1, it can be concluded that after the rear cavity of the speaker is filled with the sound-absorbing materials of Examples 1 to 2, the resonant frequency F0 of the speaker can be further reduced, thus increasing more virtual acoustic volume.

Figure 2:
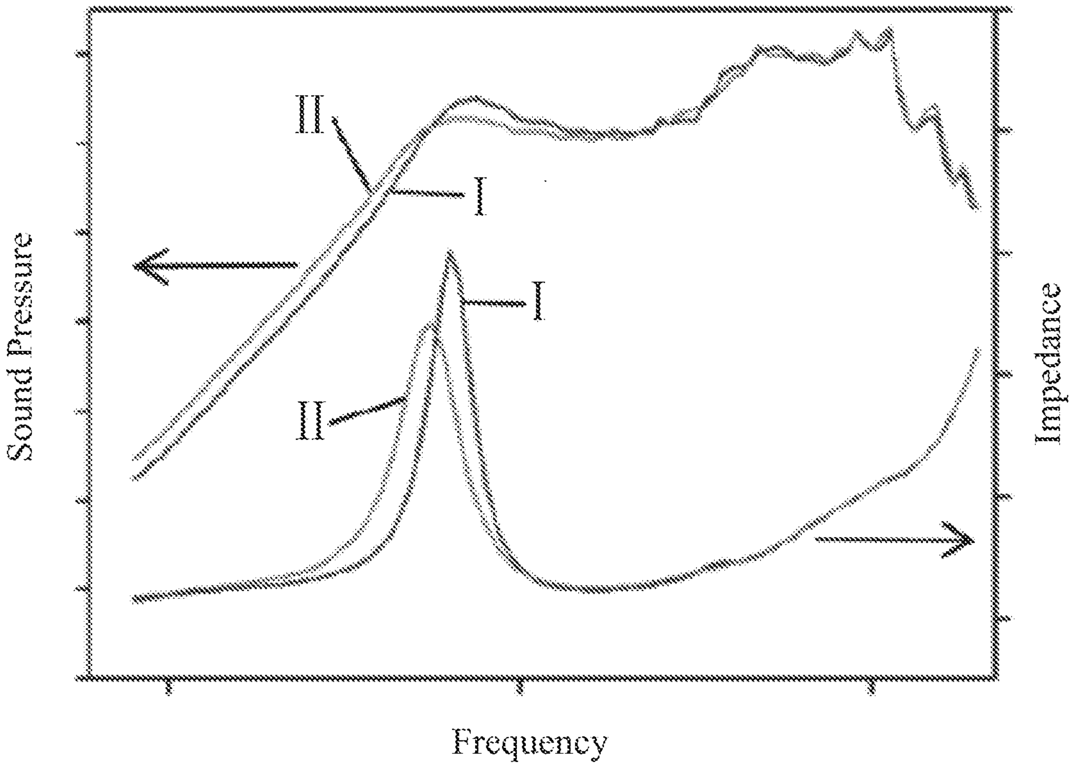
FIG. 2 is a comparison diagram of frequency response curves and impedance curves before and after addition of a sound-absorbing material in a rear cavity of a speaker of the present disclosure.

FIG. 2 shows a comparison diagram of frequency response curves and impedance curves before and after addition of a sound-absorbing material, where curves I represent the sound pressure frequency response before the sound-absorbing material is added to the rear cavity 3, and curves II represent sound pressure frequency response after the sound-absorbing material is added to the rear cavity 3. It can be seen from FIG. 2 that after the addition of the sound-absorbing material, the resonant frequency of the speaker significantly shifts to a low frequency, the virtual acoustic volume increases, and the sound pressure value of the low frequency is improved at the same time.

Compared with a related art, the sound-absorbing material and the speaker using the same, as disclosed in the present disclosure, have the following beneficial effects: the sound-absorbing material is arranged to include a metal-organic framework material of a microporous structure; the metal-organic framework material includes a coordinated metal M and OFs coordinated with the coordinated metal; the microporous structure includes a plurality of uniformly distributed micropores, and the diameter of the micropores is within a range of 0.3 nm to 1.2 nm. The sound-absorbing material is added to the rear cavity of the speaker, and the micropores with the diameter of 0.3 nm to 1.2 nm absorb and desorb air under the action of sound pressure, which can increase the acoustic compliance of the air in the rear cavity, thereby improving the low-frequency performance of the speaker.

The above are only the embodiments of the present disclosure. It should be noted here that for those of ordinary skill in the art, improvements can be made without departing from the inventive concept of the present disclosure and these improvements all belong to the scope of the present disclosure.

What is claimed is:

1. A sound-absorbing material, comprising a metal-organic framework material having a microporous structure, wherein the metal-organic framework material comprises a coordinated metal M and organic framework materials (OFs) coordinated with the coordinated metal, Al is used as the coordinated metal M, and the OFs comprise isophthalic acid or 2-aminoterephthalic acid, the metal-organic framework material is of a CAU-10 type or a CAU-1-NH2 type, the microporous structure comprises a plurality of uniformly distributed micropores, and a diameter of each of the plurality of micropores is within a range of 0.3 nm to 1.2 nm.

2. The sound-absorbing material as described in claim 1, wherein the diameter each of the plurality of micropores is within a range of 0.4 nm to 1.0 um.

3. The sound-absorbing material as described in claim 1, wherein a particle size of the metal-organic framework material is within a range of 0.1 um to 5 um.

4. The sound-absorbing material as described in claim 1, further comprising an adhesive, wherein the metal-organic frame material is formed into sound-absorbing particles after adding the adhesive.

5. The sound-absorbing material as described in claim 4, wherein the sound-absorbing particles are spherical and have a particle size of 20 um to 1.0 mm.

6. The sound-absorbing material as described in claim 4, wherein the adhesive comprises one or more of an acrylic adhesive, a polyurethane adhesive or an epoxy resin adhesive.

7. The sound-absorbing material as described in claim 4, wherein a mass of the adhesive is 1% to 10% of a mass of the sound-absorbing material.

8. A speaker, comprising a housing with an accommodating space, a sounding unit placed in the housing, and a rear cavity defined by the sounding unit and the housing, wherein the rear cavity is filled with the sound-absorbing material as described in claim 1.

* * * * *